United States Patent
Pillarisetti (10) Patent No.: US 8,386,399 B2
(45) Date of Patent: Feb. 26, 2013

(54) METHODS FOR SELECTING TRANSPORTATION PARAMETERS FOR A MANUFACTURING FACILITY

(75) Inventor: Sudhakar Pillarisetti, Scott Depot, WV (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 382 days.

(21) Appl. No.: 12/880,571

(22) Filed: Sep. 13, 2010

(65) Prior Publication Data

US 2012/0065762 A1    Mar. 15, 2012

(51) Int. Cl.
  *G06Q 50/00*    (2006.01)
  *G06Q 90/00*    (2006.01)
(52) U.S. Cl. .......................................... 705/500; 414/787
(58) Field of Classification Search .................... 701/108
  See application file for complete search history.

(56) References Cited

U.S. PATENT DOCUMENTS

| | | | |
|---|---|---|---|
| 4,160,617 A | 7/1979 | Montgomery et al. | |
| 4,604,718 A | 8/1986 | Norman et al. | |
| 4,815,190 A | 3/1989 | Haba, Jr. et al. | |
| 5,029,294 A | 7/1991 | Kim | |
| 5,091,855 A * | 2/1992 | Umehara et al. | 701/23 |
| 5,467,285 A * | 11/1995 | Flinn et al. | 700/95 |
| 6,904,343 B2 | 6/2005 | Kang | |
| 7,151,980 B2 | 12/2006 | You et al. | |
| 7,580,815 B2 | 8/2009 | Kawakami et al. | |
| 2004/0254807 A1* | 12/2004 | Laurent et al. | 705/1 |
| 2004/0260587 A1* | 12/2004 | Vanduyne | 705/7 |
| 2007/0233362 A1* | 10/2007 | Carriker et al. | 701/200 |
| 2007/0274814 A1* | 11/2007 | Kawasaki et al. | 414/217.1 |
| 2010/0023151 A1 | 1/2010 | Shieh et al. | |
| 2011/0125666 A1* | 5/2011 | Laurent et al. | 705/335 |

* cited by examiner

Primary Examiner — Shelley Chen
(74) Attorney, Agent, or Firm — Dinsmore & Shohl LLP (57) ABSTRACT

Methods for selecting transportation parameters for transporting parts from at least one point of part supply to at least one point of part demand in a manufacturing facility include determining a physical relationship between the at least one point of part supply and the at least one point of part demand, selecting a transportation route type from a preselected group of transportation route types based at least in part on the physical relationship, selecting an automated guided carrier type from a preselected group of automated guided carrier types based at least in part on the transportation route type, determining a need for traffic control based at least in part on the transportation route type, and if it is determined traffic control is needed, selecting a traffic control type from a preselected group of traffic control types based at least in part on the transportation route type.

19 Claims, 6 Drawing Sheets

METHODS FOR SELECTING TRANSPORTATION PARAMETERS FOR A MANUFACTURING FACILITY

TECHNICAL FIELD

The present specification generally relates to transporting parts in a manufacturing facility and, more specifically, methods for selecting transportation route types and automated guided carrier types for transporting parts in a manufacturing facility.

BACKGROUND

Manufacturing facilities can include a plurality of parts that are distributed to one or more locations along an assembly line. These parts can include a single type of part or a plurality of different types of parts and may be required for use at a single location in the manufacturing facility, or a plurality of locations. However, the transportation of these parts between the supply locations and the demand locations can require specific logistical parameters to avoid interference with equipment, moving assembly lines or other traffic traveling throughout the manufacturing facility. While accommodating transportation of the parts may be accomplished using various types of transportation routes, transportation vehicles, and traffic protocols, the selection of such parameters may be highly variable, time intensive and can often be the result of trial and error.

Accordingly, a need exists for alternative methods for selecting transportation parameters for transporting parts between a point of part supply and a point of part demand in a manufacturing facility.

SUMMARY

In one embodiment, a method for selecting transportation parameters for transporting parts from at least one point of part supply to at least one point of part demand in a manufacturing facility is provided. The method may include determining a physical relationship between the at least one point of part supply and the at least one point of part demand, selecting a transportation route type from a preselected group of transportation route types based at least in part on the physical relationship, selecting an automated guided carrier type from a preselected group of automated guided carrier types based at least in part on the transportation route type, determining a need for traffic control based at least in part on the transportation route type, and if it is determined traffic control is needed, selecting a traffic control type from a preselected group of traffic control types based at least in part on the transportation route type.

In another embodiment, a method for selecting transportation parameters for transporting parts from at least one point of part supply to at least one point of part demand in a manufacturing facility is provided. The method may include determining a physical relationship between the at least one point of part supply and the at least one point of part demand, selecting a transportation route type from a preselected group of transportation route types based at least in part on the physical relationship, selecting an automated guided carrier type from a preselected group of automated guided carrier types based at least in part on the transportation route type, determining a need for traffic control based at least in part on the transportation route type, and if it is determined traffic control is not needed, implementing the transportation route type and the automated guided carrier type into the manufacturing facility.

In yet another embodiment, another method for selecting transportation parameters for transporting parts from at least one point of part supply to at least one point of part demand in a manufacturing facility is provided. The method may include determining a physical relationship between the at least one point of part supply and the at least one point of part demand, selecting a transportation route type from a preselected group of transportation route types based on the physical relationship, selecting an automated guided carrier type from a preselected group of automated guided carrier types based at least in part on the transportation route type, determining a need for traffic control based at least in part on the transportation route type and the automated guided carrier type, wherein if it is determined that traffic control is needed, selecting a traffic control type from a preselected group of traffic control types based at least in part on the transportation route type, selecting a traffic monitoring protocol based at least in part on the transportation route type, and implementing the transportation route type, the automated guided carrier the traffic control signal, and the traffic monitoring protocol are implemented into the part transportation system in a factory.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
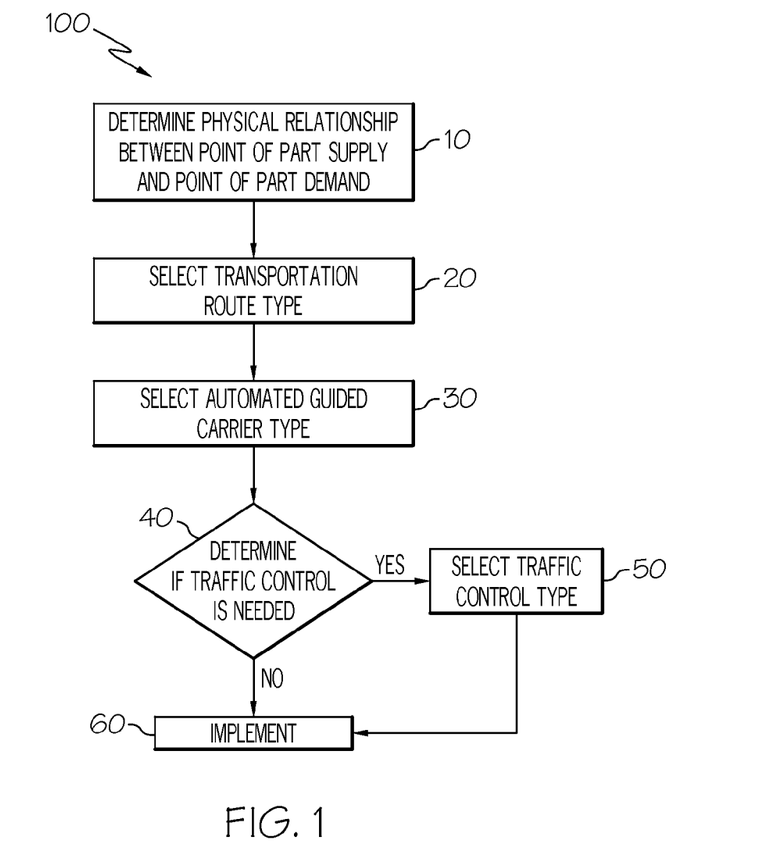
FIG. 1 depicts a method for selecting transportation route types and automated guided carrier types for transporting parts in a manufacturing facility according to one or more embodiments shown and described herein.
Figure 2:
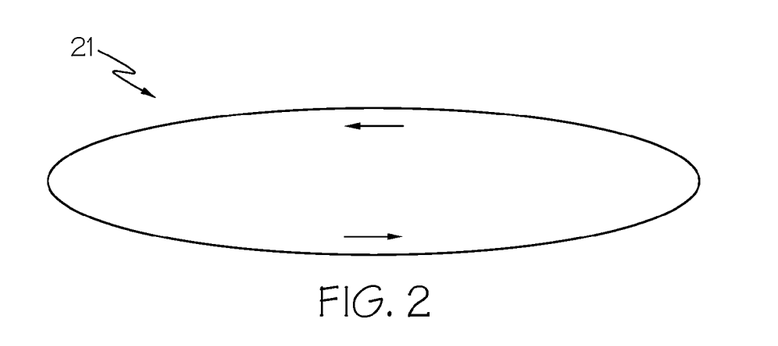
FIG. 2 depicts a single loop route type according to one or more embodiments shown and described herein.

FIG. 1 generally depicts one embodiment of a method for selecting transportation parameters for transporting parts in a manufacturing facility. The method can generally include determining a physical relationship between at least one point of part supply and at least one point of part demand. Based on the determination of the physical relationship, a transportation route type and an automated guided carrier type may be selected from preselected groups. The preselected groups of transportation route types and the automated guided carrier types may comprise various transportation routes and automated guided carriers that are available to a given manufacturing facility such as those already employed or those readily available for use. In addition, the selection of the transportation route type may be used to determine whether traffic control is needed, and if so, the type of traffic control that should be implemented. A manufacturing facility may thereby routinely select and implement the necessary parameters for transporting parts from a point of party supply to a point of part demand based on the determined variables. Various embodiments of the methods for selecting transportation parameters for transporting parts in a manufacturing facility will be described in more detail herein.

Referring to FIG. 1, a method 100 for selecting transportation parameters for transporting parts in a manufacturing facility is illustrated. Parts can comprise any part, tool, instrument, device, apparatus or the like that may be used in the manufacturing and/or assembly of a product. For example, parts may comprise individual components of a vehicle including an engine, bolts for securing a vehicle frame, vehicle body parts and/or tools required to connect two or more individual components. Furthermore, the manufacturing facility in which parts are transported can comprise any area connecting one or more locations where parts may be supplied and one or more points of the supplied parts may be used, for example, during an assembly process. For example, the manufacturing facility may comprise one or more storage facilities, warehouses, assembly lines, production lines or the like.

The method 100 may first generally comprise determining the physical relationship between at least one point of part supply and at least one point of part demand in step 10. The at least one point of part supply can comprise any point of part origination that can produce or supply parts for use elsewhere in the manufacturing facility. For example, points of part supply may comprise the end of a production line, the point or receiving deliveries from outside vendors, and/or storage areas where parts are stockpiled for later distribution and use, for example, in a first-in first-out (FIFO) storage and picking arrangement. Points of part supply may be operable to supply a single type of part, such as a first part, or may be operable to supply a plurality of parts, such as a first part and a second part. Furthermore, the manufacturing facility may comprise a single point of part supply or a plurality of points of part supply. The at least one point of part demand may comprise any point about the manufacturing facility that may periodically demand (i.e., require) one or more individual parts for the manufacturing or assembly process. For example, in one embodiment, points of part demand may comprise individual stations along an assembly line. A point of part demand may demand a single type of part (e.g., a first part) from a single point of part supply, or may demand a plurality of types of parts (e.g., a first part and a second part) from either a single point of part supply or from a plurality of points of part supply.

Still referring to FIG. 1, the physical relationship between at least one point of part supply and at least one point of part demand determined in step 10 may comprise evaluating the relative positions of the points of part supply and the points of part demand and any obstructions there between. For example, the physical relationship may comprise a direct line of sight (where no obstructions exist in the direct route between the point of part supply and the point of part demand) or may comprise one or more deviations (such as turns) to reach the point of demand from the point of supply. The physical relationship may vary based on intermediate objects, available pathways, or any other variants that may exist in a manufacturing environment. In addition, the physical relationship may depend on the number of points of part supply and the number of points of part demand. For example, a single point of part demand may require parts from a single point of part supply. In another embodiment, multiple points of part demand may require parts from a single point of part supply. Alternatively, a single point of part demand may require a first part from a first point of part supply and a second part from a second point of part supply. In another embodiment, both a first point of part supply and a second point of part supply may each require a first part from a first point of part supply and a second part from a second point of part supply. It should be appreciated that any alternative supply and demand relationships may alternatively or additionally exist such that at least one point of part supply supplies parts to at least one point of part demand.

After the physical relationship between at least one point of part supply and at least one point of part demand is determined in step 10 of method 100, a transportation route type is selected in step 20 from a preselected group of transportation route types based at least in part on the physical relationship. The preselected group of transportation route types may comprise a set group of transportation route types available to the manufacturing facility such as those already implemented in other parts of the manufacucutring facility, or those familiar to the operators of the manufacucutring facility. The transportation route type may be pre-selected to categorize the physical relationship between the points of part supply and demand as falling within a particular transportation route type and may be selected to provide efficient or convenient transportation there between. Furthermore, the transportation route type may be selected, based in part, on the physical relationship (e.g., line of sight, turns, obstructions, number of points of part supply and points of part demand). For example, in one embodiment, the preselected group of transportation route types can include lines, loops, intersections, unidirectional travel, bidirectional travel, floor based, elevated, and/or combinations thereof. Transportation route types may comprise those with automatic loading/unloading and/or manual loading/unloading at any or all of the points of part supply and the points of part demand as will become appreciated herein. Transportation route types may further comprise relatively long route types, relatively short route types, relatively wide route types or relatively narrow route types. Additionally, transportation route types may provide large loading/unloading areas or limited loading/unloading areas that may be able to accommodate a different amount of automated guided carriers.

For example, referring to FIGS. 2-5, various exemplary transportation route types 21, 22, 23 and 24 may be provided in the preselected group of transportation route types to satisfy the conditions of the various physical relationships. In one embodiment, referring specifically to FIG. 2, a single-loop route type 21 may be selected from the preselected group of transportation route types. The single-loop route type 21 may comprise a generally loop shaped configuration where automated guided carriers (as will become appreciated later herein) can travel in a repetitive loop path such that the automated guided carriers repeatedly travel in a single direction (such as a counterclockwise direction as illustrated) between at least one point of part supply and at least one point of part demand. In one embodiment, the single-loop route type 21 may be selected when the at least one point of part demand and the at least one point of part supply are in line of sight with one another such that there is no need to avoid intermediate obstacles or obstructions. The single-loop route type 21 may provide for the least expensive and simplest to monitor route type by minimizing the complexity of the route in which the automated guided carrier may take.

Figure 3:
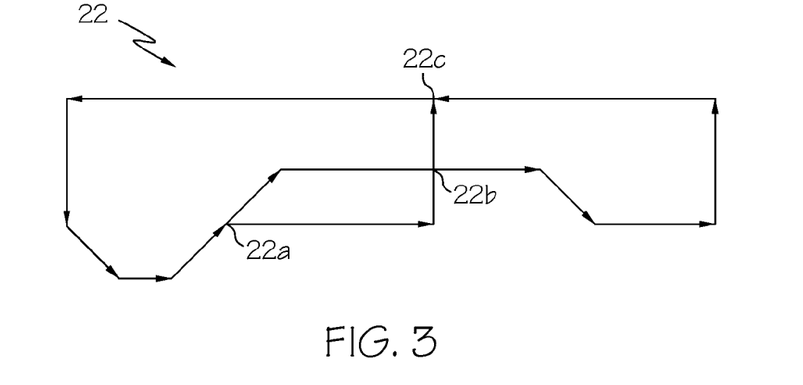
FIG. 3 depicts a multi-loop route type according to one or more embodiments shown and described herein.

Referring specifically to FIG. 3, a multi-loop route type 22 may be selected from the preselected group of transportation route types. The multi-loop route type 22 may comprise a plurality of loops that may have one or more intersections 22a, 22b and 22c. For example, as illustrated, an automated guided carrier may travel along the multi-loop route type 22 until it reaches a first intersection 22a. At the first intersection 22a, the automated guided carrier may proceed in one of various directions such that the automated guided carrier can be diverted to selective destinations (such as when two or more points of part demand are located in different areas along the route). As a result of the split path at the first intersection 22a, the two separate routes may cross at a second intersection 22b until they combine into a single path at a third intersection 22c. In one embodiment, the multi-loop route type 22 may be selected when a single point of part supply creates parts (either a single part type or a plurality of part types) that are demanded by a plurality of points of part demand. The multi-loop route type 22 may thereby provide a route type for reaching a plurality of destinations in a manufacturing facility that requires numerous points of part supply and/or numerous points of part demand.

Figure 4:
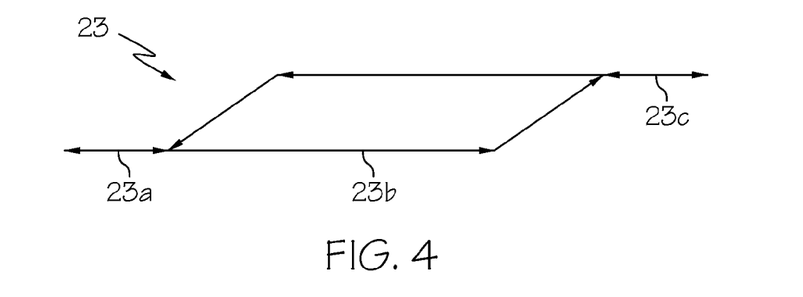
FIG. 4 depicts a bidirectional route type according to one or more embodiments shown and described herein.

Referring specifically to FIG. 4, a bidirectional route type 23 may be selected from the preselected group of transportation route types. The bidirectional route type 23 may comprise a route that enables or requires automated guided carriers to travel in both a forward and backward direction. The bidirectional route type 23 may comprise a single bidirectional line, or comprise a plurality of bidirectional lines connected to a loop. For example, as illustrated in FIG. 4, the bidirectional route type 23 may comprise a first single bidirectional line 23a that can transport automated guided carriers to a single loop 23b which further connects to a second single bidirectional line 23c. In one embodiment, the bidirectional route type 23 may be selected when there is limited space between the at least one point of part supply and at least one point of part demand such that two separate routes can not be placed there between.

Figure 5:
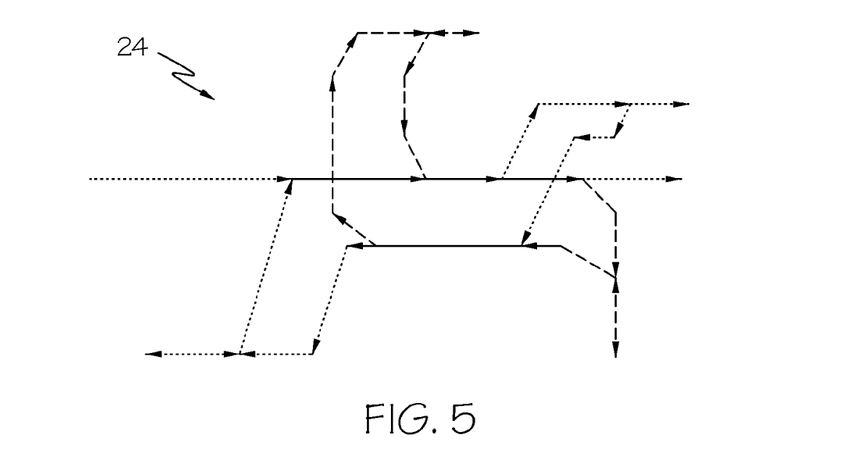
FIG. 5 depicts combination route type according to one or more embodiments shown and described herein.

Referring specifically to FIG. 5, a combination route type 24 may be selected from the preselected group of transportation route types. The combination route type 24 may comprise a combination of one or more individual route types including, but not limited to single-loop route types 21, multi-loop route types 22 and bidirectional route types 23. For example, the combination route type 24 may be selected and comprise various independent features when there are numerous points of part supply and points of part demand such that the physical relationship between individual points of part supply and points of part demand may vary. While reference has been made to specific route types (i.e., single loop route type 21, multi-loop route type 22, bidirectional route type 23 and combination route type 24) it should be appreciated that the preselected group of transportation route types may comprise other route types that can further be selected based at least in part on the physical relationship between the at least one point of part supply and at least one point of part demand. For example, other possible route types can include elevated route types when there is no available path on the ground, auto-loading route types (such as those that allow for the consistent placement of parts relative the points of part supply and points of part demand) when the points of part supply or points of part demand can automatically load or unload parts, or combinations thereof. Furthermore, in one embodiment, the specific route type selected in step 20 may involve selecting the least complex route type available for the physical relationship. For example, the single-loop route type 21 may be the first choice, the multi-loop route type 22 may the second choice, the bidirectional route type 23 may be the third choice and the combination route type 24 may be the fourth choice. In such an embodiment, the simplest route type available may be selected such that costs, maintenance, oversight and other operational parameters may thereby be reduced. Additionally, a combination of route types may be selected and/or the most complex route type may be selected when multiple route types may apply.

Referring now to FIG. 1, after the transportation route type is selected in step 20, an automated guided carrier type may be selected in step 30 from a preselected group of automated guided carrier types based at least in part on the transportation route type. The preselected group of automated guided carrier types may comprise a set group of automated guided carrier types available to the manufacturing facility such as those already implemented in other parts of the manufacutring facility, or those familiar to the operators of the manufacutring facility. The preselected group of automated guided carrier types may comprise any vehicle and/or other mode of transportation operable to automatically transport one or more parts between at least one point of part demand and at least one point of part supply. The automated guided carrier may be selected based on the physical parameters and demands associated with the transportation route type selected in step 20. For example, various automated guided carriers that can be selected in step 30 can include automated guided vehicles or non-vehicle systems, both of which may provide various pulling power, speed, loading/unloading ability, reliability, maneuverability or other transportation related ability.

For example, one exemplary embodiment of an automated guided carrier type can comprise an automated guided vehicle in which a drive unit (e.g., a motor, engine, or the like) is separable from a carrying unit (e.g., a cart, basket, shelf, or the like). These automated guided vehicles may sometimes be referred to as a turtle. As the drive unit is separable from the carrying unit, a limited number of drive units may be implemented to transport a plurality of carrying units. For example, a point of part supply may continuously load a plurality of carrying units with parts. A drive unit may then connect with a filled carrying unit and transport the carrying unit to a point of part demand. The drive unit may then separate from the carrying unit such that the point of part demand has access to the parts in the carrying unit while the drive unit can leave to either return a previously emptied carrying unit or pick up another filled carrying unit from the point of part supply. Thus, turtle-type automated guided vehicles may be selected in step 30 from the preselected group of automated guided carrier types where the transportation route type requires carrying units to remain at points of part demand for extended periods of time. In one embodiment, turtle-type automated guided vehicles may allow for relatively high maneuverability while being limited in the overall distance in travel ability. Thus, turtle-type automated guided vehicles may be selected when the route type comprises a relatively short or twisted route between the at least one point of supply and the at least one point of demand.

In another embodiment, the automated guided vehicles type can comprise a drive unit (e.g., a motor, engine, or the like) that is attached with the carrying unit (e.g., a cart, basket, shelf, or the like). These automated guided vehicles may sometimes be referred to as a fixed automated guided vehicles. Fixed automated guided vehicles may thus comprise similar properties to the turtle-type automated guided vehicles discussed above with the exception of being separable from the carrying unit. Fixed automated guided vehicles may therefore be selected in step 30 from the preselected group of automated guided carrier types when the route type is long or when the carrying unit does not remain at the point of demand for a long period of time.

Another type of automated guided vehicle may be referred to as an autoguide tugger which may be similar to a more powerful version of the turtle-type automated guided vehicle wherein a drive unit (e.g., a motor, engine, or the like) is separable from a carrying unit (e.g., a cart, basket, shelf, or the like) but wherein the drive unit is powerful enough to pull or push multiple carrying units. For example, autoguide tuggers may be operable to pull a series of carrying units filled with parts similar to the engine of a train pulling a series of cars. While autoguide tuggers may be more expensive, they can provide greater pulling power to allow for the transportation of more parts over greater distances and/or at greater speeds. Thus, in one embodiment, autoguide tuggers may be selected in step 30 from the preselected group of automated guided carrier types when the route type requires significant travel distances. In another embodiment, autoguide tuggers may be selected in step 30 when the at least one point of part demand requires a significant number of parts (such as more parts than can be transported by a single carrying unit) or heavier parts (such as parts weighing at least 1500 kg). Autoguide tuggers may also be selected when ample space is available at the at least one point of part supply and the at least one point of part demand such that the bulkier drive unit may navigate the route type.

While automated guided vehicles are discussed above, non-vehicle systems may also be included in the preselected group of automated guided carrier types. For example, conveyors can comprise a continuous track along the route type that allows the transportation of parts disposed thereon, either individually or in groups. Conveyors may allow for reliable loading of parts at points of part supply and unloading of parts at points of part demand by ensuring parts are consistently disposed in substantially the same position relative to the points of part supply and the points of part demand. This may facilitate the automation and the need for the presence of an operator by providing reliable automated loading at the points of part supply, unloading at the points of part demand and transportation there between. Conveyors may comprise continuous motion such that the transportation of parts disposed thereon is ongoing, or may repeatedly start and stop based on the presence of parts and need to transport the parts to a different location. Furthermore, conveyors may continuously move in a single direction (e.g., a forward direction) or may alternate between two directions (i.e., a forward and a backward direction). In one embodiment, a conveyor may be selected in step 30 from the preselected group of automated guided carrier types when the route type comprises a very short distance. In another embodiment, the conveyor may be selected in step 30 from the preselected group of automated guided carrier types when the route type comprises a straight line. In yet another embodiment, the conveyor may be selected in step 30 from the preselected group of automated guided carrier types when the route type requires high reliability in the location of parts relative the points of part supply and/or the points of part demand. In even yet another embodiment, the conveyor may be selected in step 30 from the preselected group of automated guided carrier types when the route type requires limited access by an operator.

Traversers may comprise another non-vehicle system that may be included in the preselected group of automated guided carrier types. Traversers can include overhead traversers or ground-based traversers. Overhead traversers can comprise an overhead continuous track along the route type that allows for the overhead carrying and transportation of parts, either individually or in groups. Overhead traversers may transport parts at an elevated height to avoid interference with the ground and equipment disposed thereon. Thus, overhead traversers may be selected in step 30 from the preselected group of automated guided carrier types when the route type requires overhead transportation above one or more obstacles. Ground-based traversers can comprise a ground-based continuous track along the route type that allows for the ground-based carrying and transportation of parts, either individually or in groups. Ground-based traversers may still allow for the movement of objects across the ground-based continuous track (unlike conveyors) when traversers are not traveling along that particular location. Similar to conveyors, traversers may allow for reliable loading of parts at points of part supply and unloading of parts at points of part demand by consistently disposing the parts in substantially the same position relative to the points of part supply and the points of part demand. Traversers may comprise continuous motion such that the transportation of parts is ongoing, or may repeatedly start and stop based on the presence of parts and need to transport the parts to a different location. Furthermore, traversers may continuously move in a single direction (e.g., a forward direction) or may alternate between two directions (i.e., a forward and a backward direction).

While reference has been made to specific types of automated guided carriers (i.e., automated guided vehicles and non-vehicle systems), it should be appreciated that other types of automated guided carriers can further be selected in step 30 from the preselected group of automated guided carrier types based at least in part on the transportation route type selected in step 20 (such as manned vehicles). For example, automated guided carrier types may be unidirectional, bidirectional, comprise optical sensors, connect to shared driving mechanisms (such as chains), or include any other feature that can facilitate the transportation of parts from a point of part supply to a point of part demand. Furthermore, in one embodiment, the specific automated guided carrier type selected in step 30 may involve selecting the least expensive automated guided carrier type in the preselected group of automated guided carrier types for the transportation route type. In such an embodiment, the simplest automated guided carrier type available may be selected from the preselected group of automated guided carrier types such that costs, maintenance, oversight and other operational parameters may be reduced. Furthermore, in some embodiments, the selection of the automated guided carrier type may further be based on other factors. For example, in one embodiment, the selection of the automated guided carrier type in step 30 from the preselected group of automated guided carrier types may also be based at least in part on the part types (e.g., size, weight, number, etc.).

In one embodiment, selecting the automated guided carrier type in step 30 may also comprise and/or depend on a material handling transfer mechanism. The material handling transfer mechanism is the mechanism in which parts are transferred between the point of part supply and the automated guided carrier as well as from the automated guided carrier to the point of part demand. For example, in one embodiment, the material handling transfer mechanism may comprise a manual transfer mechanism in which a factory worker manually moves parts on or off of the automated guided carrier. In another embodiment, the material handling transfer mechanism may comprise an automated transfer mechanism using gravity or other mechanical mechanisms. For example, the point of part supply and/or the automated guided carrier may be operable to tilt its storage load such that the plurality of parts roll or fall from one location to another. Alternatively or additionally, a mechanical force such as an actuating arm may push, pull, sweep or other otherwise move the parts. In even other embodiments, a conveyor or robotic arm may also or alternatively transfer parts either individually or in bulk. In one alternative embodiment, no material part transfer mechanism may be provided. For example, parts may be supplied at the point of part supply already on the automated guided carrier and/or the point of part demand may work directly from the automated guided carrier such that no transfer occurs in moving the plurality of parts to a storage bin or the like. It should be appreciated that the material handling transfer mechanism may thereby comprise any suitable mechanism that transfers parts as need between the point of part supply and the automated guided carrier as well as from the automated guided carrier to the point of part demand. Furthermore, in one embodiment, the same material part transfer mechanism may be used at both the point of part supply and the point of part demand. In another embodiment, a first type of material part transfer mechanism may be used at the point of part supply while a second type of material part transfer mechanism may be used at the point of part demand. In even yet another embodiment, both the point of part supply and the point of part demand may comprise multiple types of material handling transfer mechanisms.

Referring still to FIG. 1, after the automated guided carrier is selected in step 30 from the preselected group of automated guided carrier types, the need for traffic control may be determined in step 40. Traffic control may comprise the ability to control the movement of automated guided carriers by monitoring and/or regulating their progression. In one embodiment, determining the need for traffic control may comprise determining the possibility of collision between the automated guided carriers and other objects (or other automated guided carriers). For example, when the transportation route type requires an elevated route type or an unobstructed route type (such as those that would result in selecting a conveyor or traverser as the automated guided carrier) then it may be determined that no collision is possible (as there are no other objects along the route type) and that traffic control is not needed. In another example, when the transportation route type enables potential collisions, such as transportation route types that require intersections or bidirectional movement, traffic control may be determined necessary to avoid any such collisions.

Figure 6:
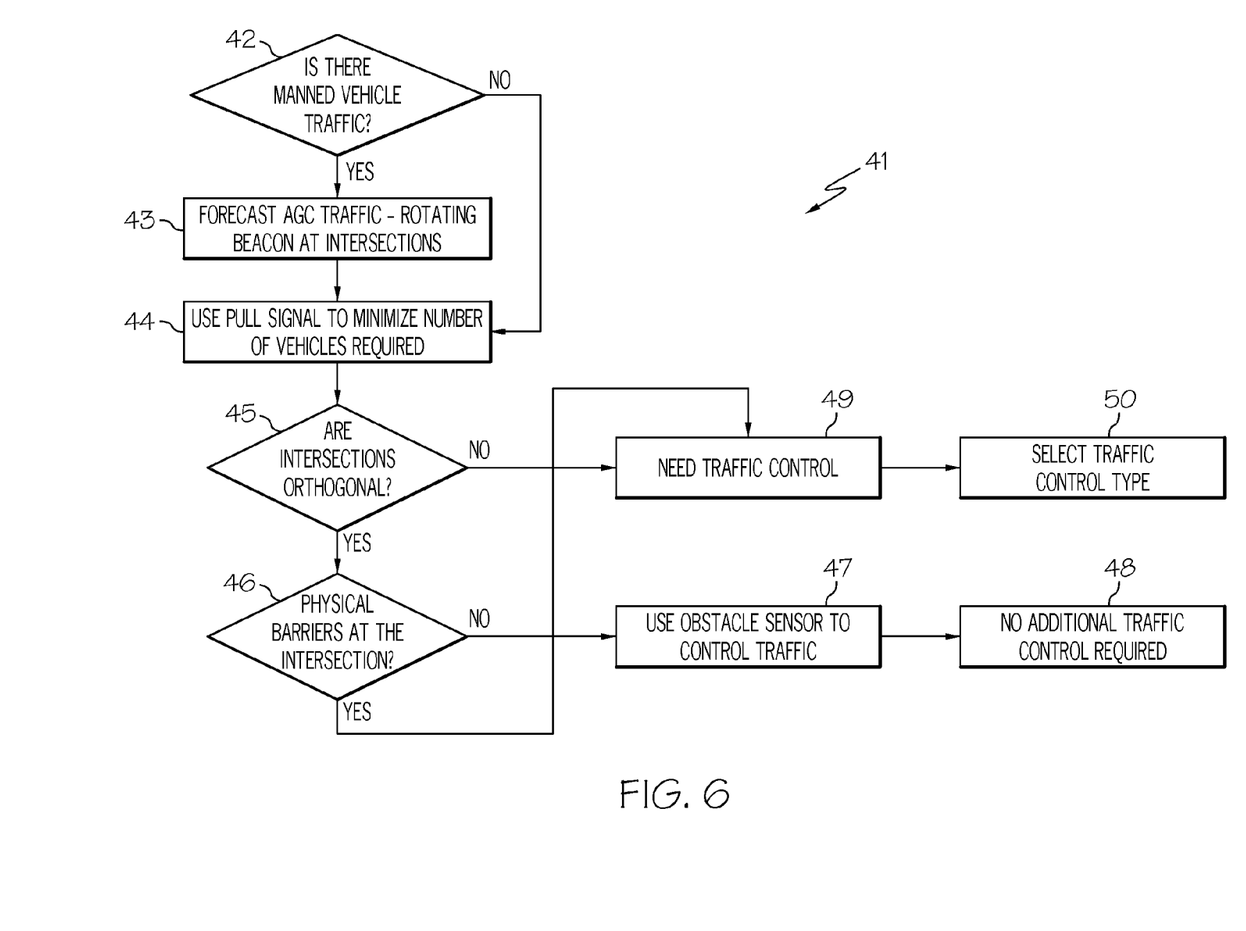
FIG. 6 depicts a method for determining the need for traffic control according to one or more embodiments shown and described herein.

Referring now to FIG. 6, one exemplary method 41 is illustrated to determine the need for traffic control. The exemplary method 41 to determine the need for traffic control can first comprise determining whether there is manned vehicle traffic 42 along the transportation route. Manned vehicle traffic can comprise any motorized or non-motorized traffic manually operated by an operator that may travel or cross on all or part of the route between the at least one point of part supply and the at least one point of part demand. If manned traffic exists (such as a forklift operator that periodically crosses the route at an intersection), then intersections may be equipped with rotating beacons or other warning devices in step 43 to inform the manned vehicles of incoming automated guided carrier traffic. After such a determination is made, in one embodiment, pull signals (as will become appreciated later herein) may be utilized in step 44 to minimize the amount of automated guided carriers on the route by only sending the automated guided carriers when parts are demanded by a point of part demand. In another embodiment, pull signals may not be utilized such that automated guided carriers continuously traverse between points of part supply and points of part demand. After manned traffic and pull signals are considered in steps 43 and 44, the physical layout of intersections may be determined in step 45 to determine whether the sensors on the automated guided carriers can detect crossing traffic as they approach intersections. If the transportation route type comprises intersections that are not orthogonal, the optical sensors on automated guided carriers may not be able to detect approaching traffic due to limited peripheral vision. In such instances, the need for traffic control is determined positive in step 49 and the traffic control type is selected in step 50. However, if the intersections are orthogonal (such that the optical sensors would be able to detect crossing traffic allowing it to stop before a collision), then it may be determined whether physical barriers exist at the intersections in step 46. Physical barriers may comprise any equipment, supplies, or other objects that may be present at the corners of the intersections and block the line of sight of crossing traffic. When physical barriers are present, the optical sensors on the automated guided carriers may not be able to detect crossing traffic. Therefore, when physical barriers are present, the need for traffic control is determined positive in step 49 and the traffic control type is selected in step 50. However, if no physical barriers are present, then it can be determined in step 47 to use obstacle sensors to control traffic. For example, in one embodiment obstacle sensors can comprise optical sensors on the automated guided carriers that can detect crossing traffic and stop the automated guided carrier to prevent collision. After the use of obstacle sensors are determined in step 47 it can be concluded that no additional traffic control is required in step 48 as the obstacle sensors have a clear line of sight along the orthogonal intersections without physical barriers and can safely direct the movement of the automated guided carrier without the need for traffic control.

In another embodiment, the need for traffic control determined in step 40 may further be based at least in part on the automated guided carrier type. For example, where the automated guided carrier type comprises a conveyor or a traverser, traffic control may not be needed as there may be no external traffic crossing the route. In yet another embodiment, the traffic control determined in step 40 may depend on the part type. For example, if the part type has a limited time of functionality and must be transported from the point of part supply to the point of part demand on an expedited time frame, traffic control may be deemed necessary to ensure the part type with a limited time of functionality is prioritized over others.

Referring back to FIG. 1, if it is determined that traffic control is needed in step 40, then the traffic control type may be selected in step 50 from a preselected group of traffic control types. The traffic control type may be based at least in part on the transportation route type from a preselected group of traffic control types. The preselected group of traffic control types may comprise any traffic control type available to the manufacturing facility such as those already implemented in other parts of the manufacutring facility, or those familiar to the operators of the manufacutring facility. For example, where the route type comprises orthogonal intersections with physical barriers, the traffic control may comprise one or more optical sensors implemented about the intersection to control traffic. In another embodiment, such as where the route type comprises non-orthogonal intersections, traffic control may comprise an intersection controller that monitors the presence of automated guided carriers in the immediate vicinity of the intersection. The traffic control type selected in step 50 from a preselected group of traffic control types may be selected to overcome any observation or communication deficiencies brought about by the transportation route type selected in step 20.

For example, in one embodiment, such as where the transportation route type comprises non-orthogonal intersections, the selected traffic control type may comprise a zone monitoring method where an intersection control unit monitors the automated guided carriers around the intersection. For example, the automated guided carriers may stop before each intersection. Intersection controllers may monitor the positions of automated guided carriers using wireless radio (such as that at about 900 MHz). RFID tags may also be disposed along the route to identify the location of automated guided carriers. The intersection controller can then monitor the positions of the automated guided carriers based on the RFID tags and control their movement through the intersection using wireless radio communication. For example, in one specific embodiment, an automated guided carrier may stop before the intersection and progress only when instructed by the intersection controller. The stopped automated guided carrier may then be instructed to proceed when one or more RFID tags on the other side of the intersection are free so that the automated guided carrier is not forced to stop in the middle of the intersection.

While specific embodiments of traffic control have been discussed herein, it should be appreciated that any other forms of traffic control may be selected based at least in part on the transportation route type. For example, traffic control types can comprise optical sensors (e.g., cameras, lasers, etc.) where line of sight is allowed, physical sensors (e.g., pressure plates, proximity sensors, etc.) when line of sight is inhibited, or audible sensors when line of sight and physical contact is inhibited. Furthermore, traffic control types may comprise a variety of communication methods such as, for example, wireless radio at about 900 MHz, a wireless radio at about 2.4 GHz, a wireless radio at about 5 GHz, visual communication, physical communication (such as lowering barriers to physically stop or redirect movement) or the like.

Referring still to FIG. 1, in one embodiment, after the need for traffic control is determined in step 40 (and potentially selected in step 50), the transportation route type, automated guided carrier type and/or the traffic control type may be implemented in step 60. Implementing the transportation route type, the automated guided carrier type and/or the traffic control type can comprise physically building, installing or otherwise constructing and utilizing the selected transportation route type, the automated guided carrier type and/or the traffic control type in the manufacturing facility to allow for the transportation of parts between at least one point of part supply and at least one point of part demand.

Figure 7:
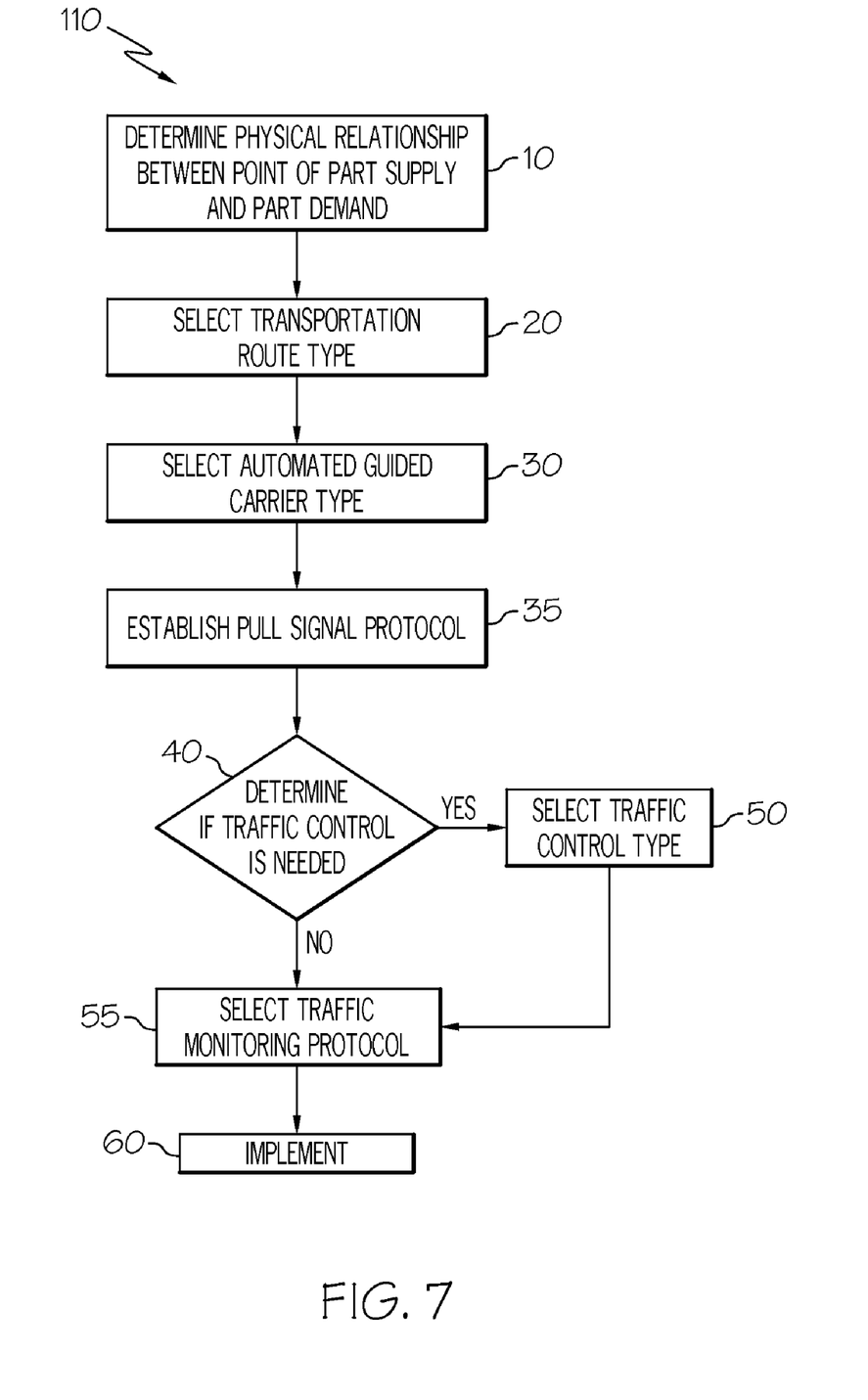
FIG. 7 depicts another method for selecting transportation route types and automated guided carrier types for transporting parts in a manufacturing facility according to one or more embodiments shown and described herein.
Figure 8:
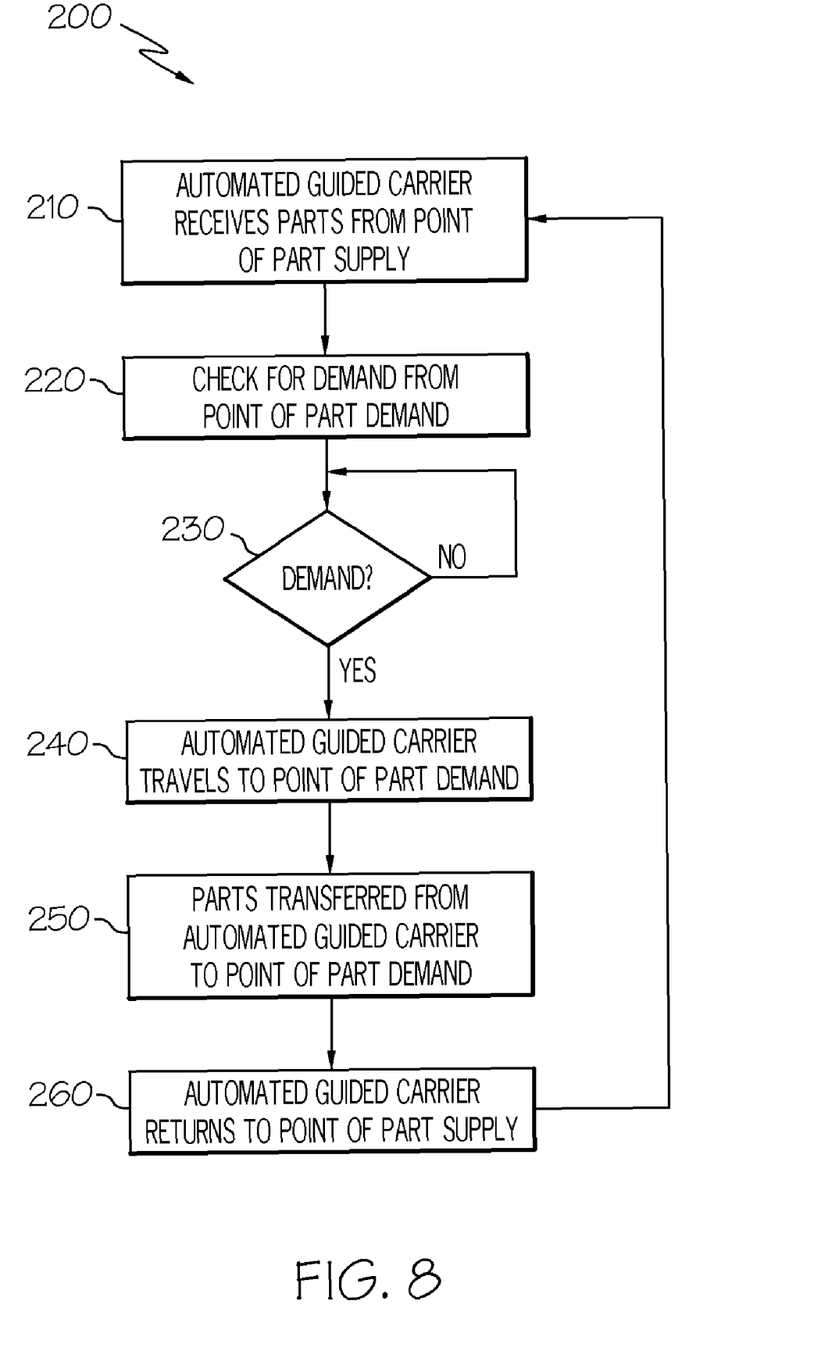
FIG. 8 depicts a pull signal method according to one or more embodiments shown and described herein.

Referring now to FIG. 7, in one embodiment, a method 110 for selecting transportation parameters for transporting parts in a manufacturing facility may further comprise establishing a pull signal protocol in step 35 and/or selecting traffic monitoring protocol in step 55. Referring to FIGS. 7 and 8, a pull signal protocol may comprise the protocol for when an automated guided carrier leaves a point of supply for a point of demand with a load of parts. Pull signal protocols may allow for more limited traffic along the route by only sending automated guided carriers when required, as opposed to continuously sending automated guided carriers without specific demands. Referring now to FIG. 8, one exemplary pull signal protocol 200 is illustrated. The pull signal protocol may first comprise an automated guided carrier receiving one or more parts from a point of part supply in step 210. After the automated guided carrier receives the one or more parts, it checks for any demand from one or more points of part demand in step 220. If there is no demand for parts from any of the points of part demand, the automated guided carrier will wait at the point of part supply and continue checking for demand in step 230. However, once there is a demand for parts from a point of part demand in step 230, then the automated guided carrier leaves the point of part supply and travels to the point of part demand in step 240. Once at the point of part demand, the parts are transferred from the automated guided carrier to the point of part demand in step 250. After the parts are transferred from the automated guided carrier in step 250, then the automated guided carrier returns to the point of part supply in step 260. The pull signal protocol 200 may then continuously repeat itself to transport parts from points of part supply to points of part demand as needed.

Referring to FIG. 7, in one embodiment, establishing a pull signal protocol may further comprise determining how many parts are left at a point of part demand, how quickly those parts will be used and how long it will take for new parts to be transported from the point of part supply. For example, if a point of part demand only possesses enough parts for an additional 1 hour of operation, and it requires 10 minutes for parts to be transported by an automated guided carrier from a point of part supply to the point of part demand, then the pull signal protocol may further comprise requesting parts from the point of part demand within at least then next 50 minutes to ensure it can continue its operation without interruption. The pull signal protocol may further comprise prioritizing certain part deliveries over others based on the urgency of need by various points of part demand, grouping the transportation of parts between a point of part supply and a plurality of points of part demand when the plurality of points of part demand are all within a close proximity, or any other logistical variation in the demand and sending of parts via an automated guided carrier between a point of part supply and a point of part demand.

Referring back to FIG. 7, the method 110 for selecting transportation parameters for transporting parts in a manufacturing facility may further comprise selecting a traffic monitoring protocol in step 55. The traffic monitoring protocol may be any protocol for one or more operators or computers at the point of part supply and/or the point of part demand to monitor the progress of part transportation such as the loading of parts from the point of part supply to the automated guided carrier, the transportation of the loaded automated guided carrier from the point of part supply to the point of part demand, the unloading of parts from the automated guided carrier to the point of part demand, and/or the transportation of the unloaded automated guided carrier from the point of part demand to the point of part supply. The selection of traffic monitoring protocol can depend at least in part on the transportation route type.

Figure 9:
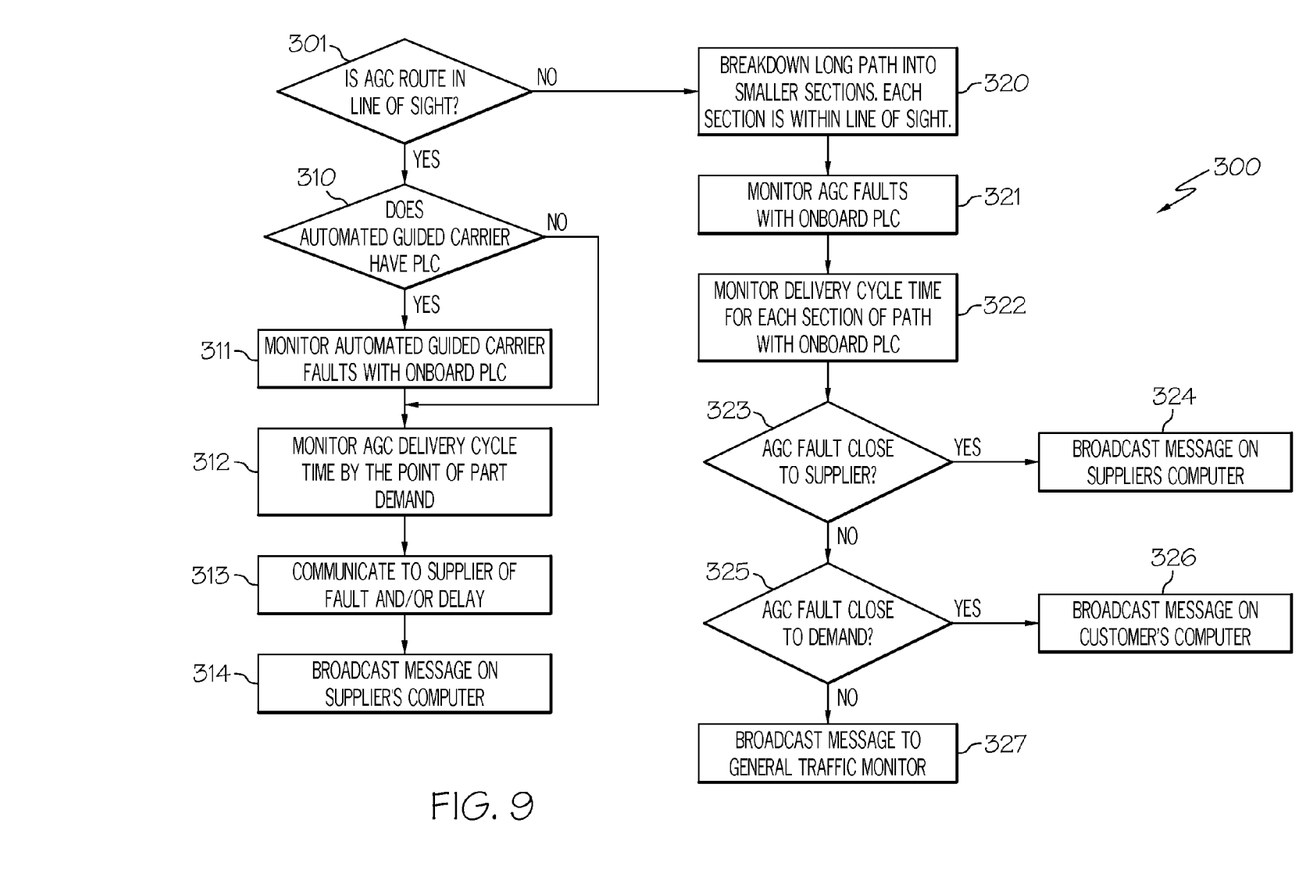
FIG. 9 depicts a method for monitoring traffic control according to one or more embodiments shown and described herein.

For example, one exemplary traffic monitoring protocol 300 is illustrated in FIG. 9. The traffic monitoring protocol 300 may first comprise determining whether the route for the automated guided carrier is in the line of sight of an operator in step 301 (i.e., an operator may maintain visual contact with the automated guided carrier throughout its movement between the point of part supply and the point of part demand). If the route is in an operator's line of sight, it may be determined whether the automated guided carrier has a programmable logic controller ("PLC") or computer in step 310. The PLC or computer may comprise any onboard system operable to monitor one or more fault signals on the automated guided controller. Fault signals can include, for example, low battery, bumper collision, obstructions in the route, loss of route boundary (such as when the borders of the route are defined by magnetic tape and the automated guided carrier fails to detect any magnetic tape), or part transferring errors. For example, in one embodiment, a PLC may be operable to detect and/or monitor basic fault detections such as collisions or sirens. In another embodiment, the automated guided carrier may comprise a computer in addition to or instead of the PLC. The computer may generally comprise a more sophisticated fault-monitoring system such as by being operable to capture and process images when detecting faults. If the automated guided carrier includes a PLC or computer, the fault signals can be monitored by the PLC or computer in step 311. Otherwise, the delivery cycle time (i.e., the time it takes for the automated guided carrier to travel from the point of part supply to the point of part demand) and/or faults may be monitored by the point of part demand in step 312. If the point of part demand detects that the delivery cycle time has lapsed without a delivery, or observes a collision, stalled automated guided carrier, or other fault, then the point of part demand can communicate the delay or fault to the point of part supply in step 313 and the delay or fault can be broadcast on the computer at the point of part supply in step 314. This can allow for the notification and troubleshooting of a delayed or faulty delivery.

Still referring to the traffic monitoring protocol 300 in FIG. 9, if the route for the automated guided carrier is not in a line of sight, then the route can be broken down into smaller sections in step 320 wherein each section is within a line of sight. This may ensure the automated guided carrier can always be observed by some observation method (e.g., a camera) despite its location along the route. After the route is broken down into smaller sections in step 320, the faults of the automated guided carrier may be monitored by the onboard PLC or computer in step 321. It should be noted that automated guided controllers without PLCs or computers may not be conducive to longer route types without a single line of sight as operators cannot observe the automated carriers from the point of part supply or the point of part demand. The delivery cycle time for each section of the path may be monitored by the onboard PLC or computer in step 322 such that any faults or delivery cycle delays can be monitored and reported. Once a fault is reported (e.g., a delayed delivery cycle, collision, etc.), it is determined in step 323 whether the location of the fault occurrence is close to the point of part supply. Close can mean any distance that is easily accessible to the point of part supply such that it would be quicker for an operator to reach the faulty automated guided carrier from the point of part supply than another location. If it is close to the point of part supply, then the error message is broadcast onto the computer at the point of part supply in step 324 so that an operator may then go and inspect and/or repair the faulty automated guided carrier. If the fault is not determined to be close to the point of part supply in step 323, then it is determined in step 325 whether the location of the fault occurrence is close to the point of part demand. If it is determined that the location is in fact close to the point of part demand, then the error message is broadcast onto the computer at the point of part demand in step 326 so that an operator may then go and inspect and/or repair the faulty automated guided carrier. If the location of the fault is not close to point of part demand, then the fault message may be broadcast to a general traffic monitor in step 327. The general traffic monitor may comprise any central or global traffic control system that may alert one or more operators not specifically located at the point of part supply or the point of part demand of the fault who can proceed to address the error.

Referring to FIG. 7, in another embodiment, the selection of traffic monitoring protocol may comprise the selection of traffic control signals at the point of part supply and the point of part demand to alert operators at one or both locations of the status of the automated guided carrier. For example, where the route type comprises manual loading and unloading of parts at both the point of part supply and the point of part demand, traffic control signals may be displayed to the operators at every step (e.g., load request, loading, load complete, demand call, transit, arrival, etc.) to ensure the operators are aware of when they need to load or unload parts from an automated guided carrier. In another embodiment, such as where the point of part supply can automatically load the automated guided carrier but the point of part demand requires manually unloading, a traffic monitoring signal may not be required for the arrival forecast of the automated guided carrier at the point of part supply because the operator is not needed for loading. Likewise where the point of part demand can automatically unload the automated guided carrier but the point of part supply requires manually loading, a traffic monitoring signal may not be required for the arrival forecast of the automated guided carrier at the point of part demand because the operator is not needed for unloading. Additionally, where the point of part demand can automatically unload the automated guided carrier and the point of part supply can automatically load the automated guided carrier, a traffic monitoring signal may not be required for the arrival forecast of the automated guided carrier at either the point of part demand or the point of part supply because the operator is not needed for unloading or loading. It should be appreciated that other traffic monitoring signals may further be selected or omitted based at least in part on the transportation route type such as when the transportation route type influences the need for manual operator input.

It should now be appreciated that methods for selecting transportation parameters may be utilized to efficiently and routinely select a transportation route type, an automated guided carrier type, a pull signal protocol, a traffic control type, and/or a traffic monitoring protocol for the transportation of parts in a manufacturing facility. Based on the determination of the physical relationship between at least one point of part supply and at least one point of part demand, the selection process of various transportation parameters may become more standardized and result in selections that conform to the requirements of transporting parts in a particular setting. Thus, the selection and implementation of transportation parameters may occur in quicker and more successful manner without the need of iterative trials before selecting reaching the final setup.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for selecting transportation parameters for transporting parts from at least one point of part supply to at least one point of part demand in a manufacturing facility, the method comprising:
    determining a physical relationship between the at least one point of part supply and the at least one point of part demand;
    selecting a transportation route type from a preselected group of transportation route types based at least in part on the physical relationship;
    selecting an automated guided carrier type from a preselected group of automated guided carrier types based at least in part on the transportation route type;
    determining a need for traffic control based at least in part on the transportation route type; and
    if it is determined traffic control is needed, selecting a traffic control type from a preselected group of traffic control types based at least in part on the transportation route type, wherein the transportation route type, the automated guided carrier type and the traffic control type are implemented into the manufacturing facility.

2. The method of claim 1 wherein the at least one point of part supply comprises a first point of part supply that supplies a plurality of first parts and a plurality of second parts.

3. The method of claim 2 wherein the at least one point of part demand comprises a first point of part demand that demands the plurality of first parts and a second point of part demand that demands the plurality of second parts.

4. The method of claim 3 wherein selecting the transportation route type from the preselected group of transportation route types comprises selecting a multi-loop route that connects the first point of part supply to both the first point of part demand and the second point of part demand.

5. A method for selecting transportation parameters for transporting parts from at least one point of part supply to at least one point of part demand in a manufacturing facility, the method comprising:
    determining a physical relationship between the at least one point of part supply and the at least one point of part demand;
    selecting a transportation route type from a preselected group of transportation route types based at least in part on the physical relationship;
    selecting an automated guided carrier type from a preselected group of automated guided carrier types based at least in part on the transportation route type;
    determining a need for traffic control based at least in part on the transportation route type; and
    implementing the transportation route type and the automated guided carrier type into the manufacturing facility.

6. The method of claim 5 wherein selecting the automated guided carrier type from the preselected group of automated guided carrier types is further based at least in part on part types.

7. The method of claim 5 wherein when the transportation route type comprises an elevated route type, the selected automated guided carrier type comprises an overhead traverser.

8. The method of claim 5 wherein when the transportation route type comprises a long route type, the selected automated guided carrier type comprises an autoguide tugger.

9. The method of claim 5 wherein determining the need for traffic control is further based at least in part on the automated guided carrier type.

10. A method for selecting transportation parameters for transporting parts from at least one point of part supply to at least one point of part demand in a manufacturing facility, the method comprising:
    determining a physical relationship between the at least one point of part supply and the at least one point of part demand;
    selecting a transportation route type from a preselected group of transportation route types based on the physical relationship;
    selecting an automated guided carrier type from a preselected group of automated guided carrier types based at least in part on the transportation route type;
    determining a need for traffic control based at least in part on the transportation route type and the automated guided carrier type, wherein if it is determined that traffic control is needed, selecting a traffic control type from a preselected group of traffic control types based at least in part on the transportation route type;
    selecting a traffic monitoring protocol based at least in part on the transportation route type; and
    implementing the transportation route type, the automated guided carrier type, the traffic control type, and the traffic monitoring protocol into the manufacturing facility.

11. The method of claim 10 further comprising establishing a pull signal protocol for sending the automated guided carrier type only when parts are demanded by any of the at least one point of part demand.

12. The method of claim 10 wherein when the transportation route type does not possess a single line of sight, the selected traffic monitoring protocol comprises monitoring a fault signal using a programmable logic controller or computer on the automated guided carrier type.

13. The method of claim 12 wherein the traffic monitoring protocol comprises determining if a location of the fault signal is close to the at least one point of part supply or the at least one point of part demand.

14. The method of claim 10 wherein if the transportation route type comprises non-orthogonal intersections, then the need for traffic control is determined positive.

15. The method of claim 10 wherein if the transportation route type comprises orthogonal intersections without physical barriers, then the need for traffic control is determined negative.

16. The method of claim 10 wherein selecting the automated guided carrier from the preselected group of automated guided carrier types is further based at least in part on part types.

17. The method of claim 10 wherein the at least one point of part supply comprises a first point of part supply that supplies a plurality of first parts and a plurality of second parts.

18. The method of claim 17 wherein the at least one point of part demand comprises a first point of part demand that demands the plurality of first parts and a second point of part demand that demands the plurality of second parts.

19. The method of claim 18 wherein selecting the transportation route type from the preselected group of transportation route types comprises selecting a multi-loop route that connects the first point of part supply to both the first point of part demand and the second point of part demand.

* * * * *